United States Patent [19]

Takusagawa et al.

[11] 3,911,987

[45] Oct. 14, 1975

[54] PNEUMATIC SAFETY TIRE FOR MOTORCYCLES

[75] Inventors: Takashi Takusagawa, Ohme; Akira Fujikawa, Kodaira, both of Japan

[73] Assignee: Bridgestone Tire Company Limited, Tokyo, Japan

[22] Filed: Nov. 6, 1973

[21] Appl. No.: 413,305

[30] Foreign Application Priority Data
Nov. 13, 1972 Japan.............................. 47-112869

[52] U.S. Cl........ 152/354; 152/209 R; 152/330 RF; 152/353; 152/357; 152/374
[51] Int. Cl.². .................. B60C 9/02; B60C 13/00; B60C 17/00
[58] Field of Search.. 152/209 R, 330 RF, 352–354, 152/357, 359, 374

[56] References Cited
UNITED STATES PATENTS

| | | | |
|---|---|---|---|
| 3,207,200 | 9/1965 | Boussu et al......................... | 152/354 |
| 3,232,331 | 2/1966 | Cappa et al.......................... | 152/354 |
| 3,464,477 | 9/1969 | Verdier................................ | 152/353 |
| 3,782,440 | 1/1974 | Depmeyer............................ | 152/354 |

*Primary Examiner*—Drayton E. Hoffman
*Attorney, Agent, or Firm*—Sughrue, Rothwell, Mion, Zinn & Macpeak

[57] ABSTRACT

A pneumatic safety tire for motorcycles, which includes a pair of elastic reinforcing layers disposed along the carcass plies of the tire, so as to extend from the proximity of tire beads to tire inner surface under the tread rubber. The Shore A hardness of the reinforcing layer is 45 or more, so that the safety tire can run at a high-speed even after puncture, while providing excellent handling characteristics under normal conditions.

11 Claims, 11 Drawing Figures

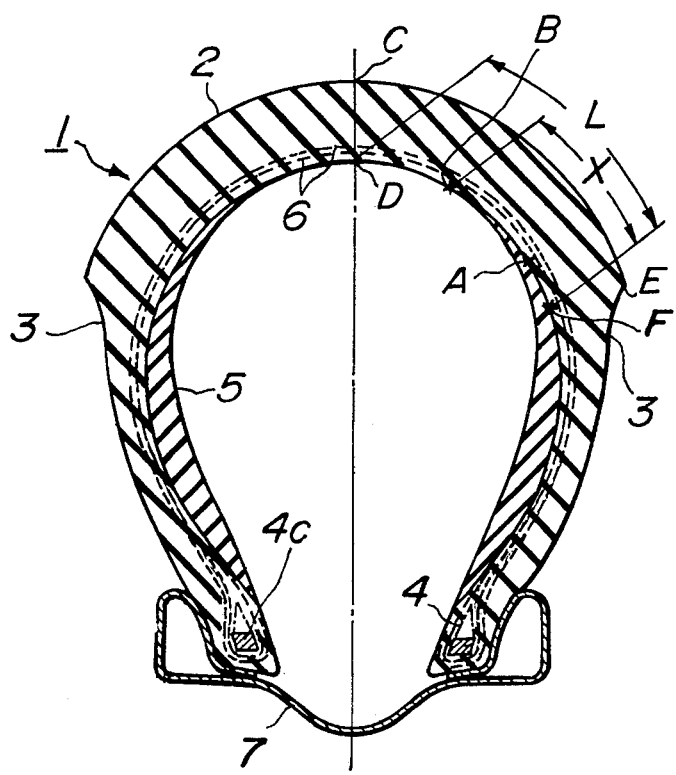
FIG_1A

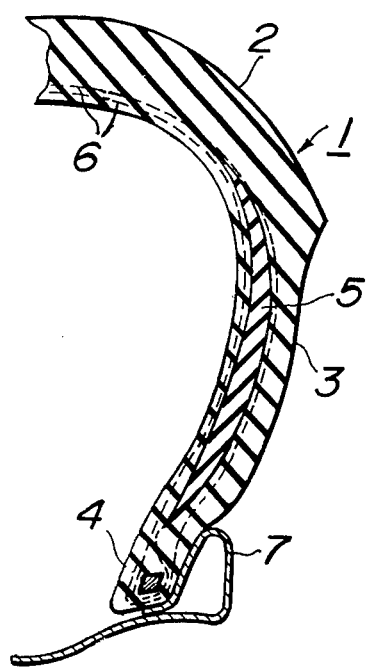
FIG_1B

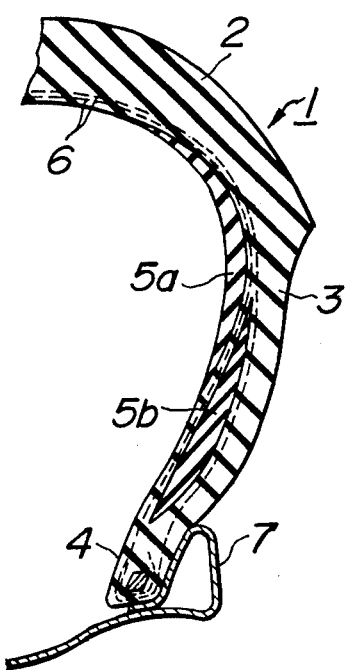
FIG_IC
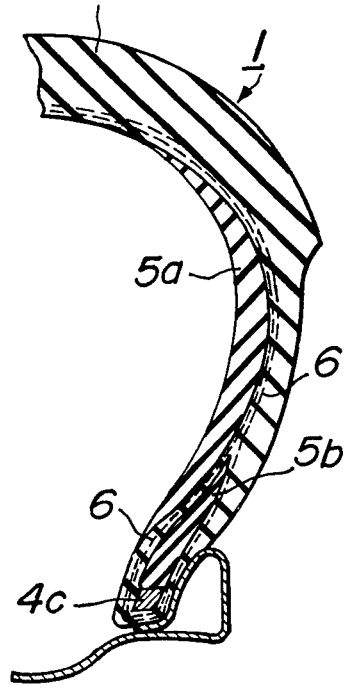
FIG_ID

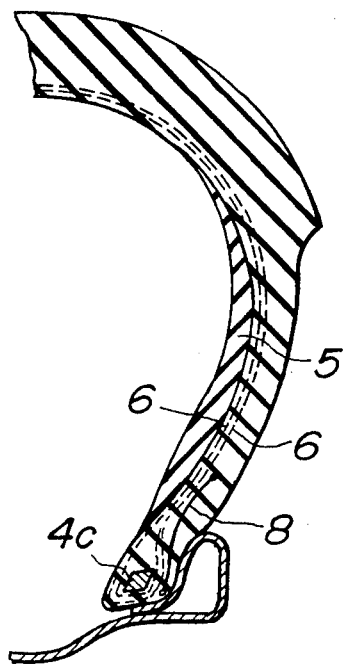 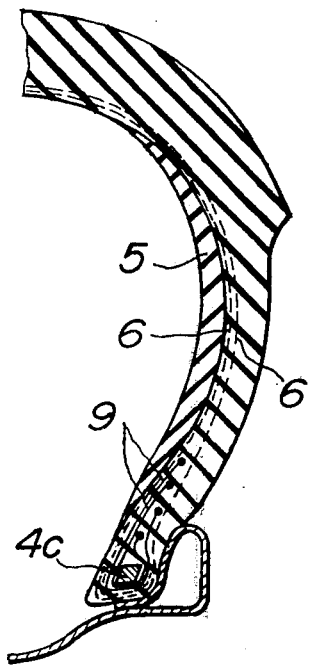

FIG_3A
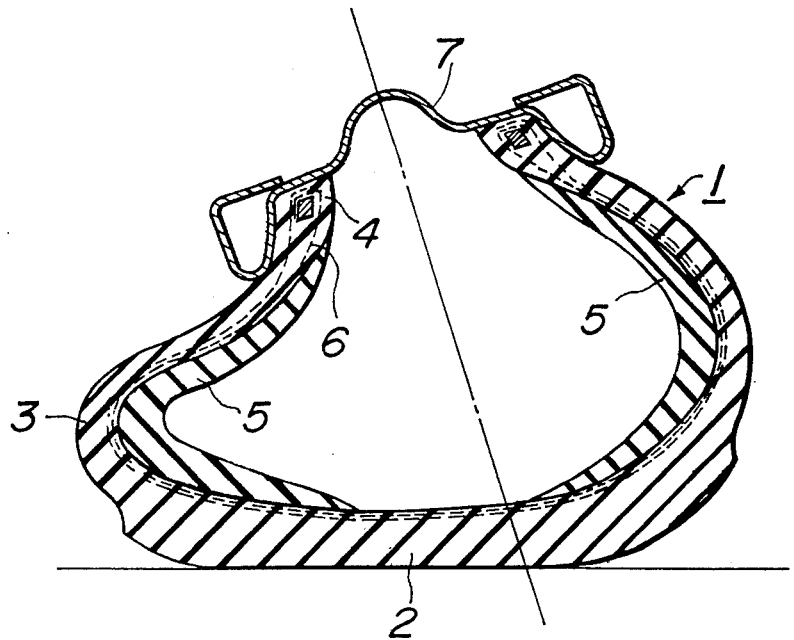
FIG_3B    PRIOR ART
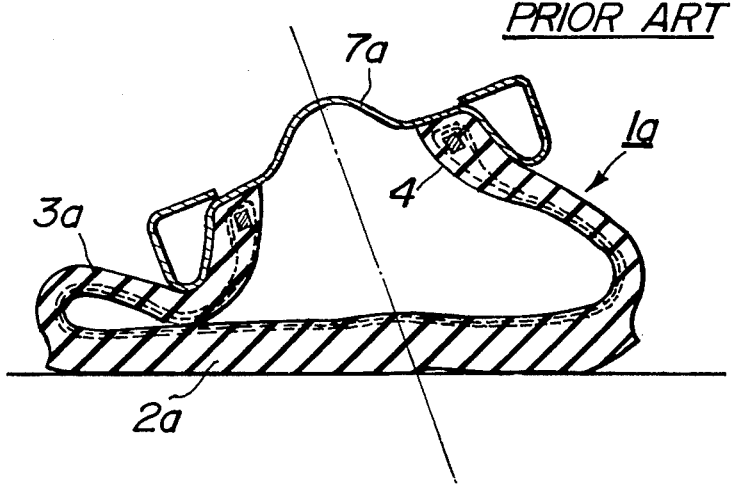

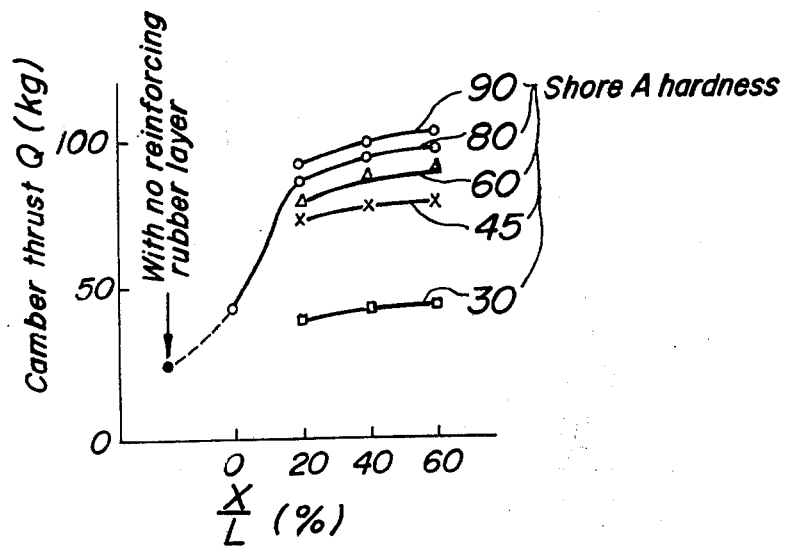

FIG_5A    FIG_5B
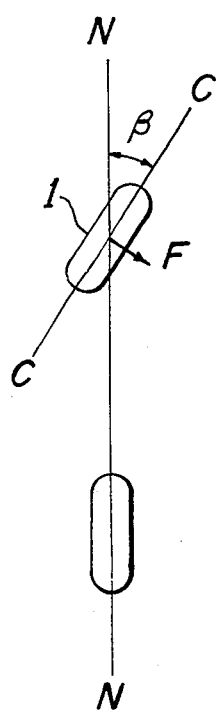
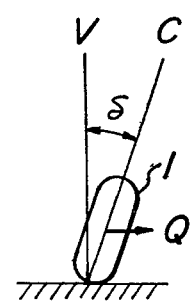

PNEUMATIC SAFETY TIRE FOR MOTORCYCLES

BACKGROUND OF THE INVENTION

1. Field of the Invention

This invention relates to a pneumatic safety tire for motorcycles, and more particularly to a pneumatic safety tire which has such a high wall stiffness that, when the tire is punctured during running and the pneumatic pressure is lost from the inside of the tire, the tire can bear the load of the motorcycle so as to allow safe drive to a place for repair without reducing the speed to an extremely low level.

The pneumatic safety tire of the invention can ensure a good high-speed handling characteristics and a high steering stability when it is applied to motorcycles.

In order to ensure safety at the time of puncture or burst, various pneumatic safety tires of dual structure have been proposed heretofore for application to four-wheeled vehicles, for instance, a composite safety tire comprising an outer tire wall of conventional structure and an inner tire wall disposed within the tire chamber defined by the outer tire wall. Such conventional safety tire for four-wheeled vehicles are not suitable for application to two-wheeled motorcycles, because they may cause an excessive weight increase.

With the conventional safety tire of dual structure, once the outer tire wall is punctured, the pneumatic pressure in the inter-wall space between the inner tire wall and the outer tire wall is lost, so that the pneumatic pressure within the inner tire wall becomes effective. In the case of a four-wheeled vehicle, the loss of the pneumatic pressure from the inter-wall space of one of the four tires thereof will not affect the performance of the vehicle so seriously, because the remaining three tires will retain their full capacity. However, in the case of a motorcycle, the loss of the pneumatic pressure from the inter-wall space of one of the two tires will significantly affect the performance of the motorcycle, because only one tire remains sound. Furthermore, in the case of motorcycle, the tire is often inclined relative to the vertical by a large angle, so as to produce a large centripetal force, which angle relative to the vertical is generally referred to as the "camber angle". If a safety tire of the dual structure is inclined by a large camber angle after its outer tire wall is punctured, the absence of the pneumatic pressure at the inter-wall space between the inner and outer tire walls tends to cause the inner tire wall to slip on the outer tire wall which is in contact with the road surface. Thereby, the road-holding power of the tire may be reduced. Accordingly, the conventional pneumatic safety tires of the dual structure type is not suitable for motorcycle use from the standpoint of their performance, too.

The conventional safety tire of the dual structure type has other intrinsic shortcomings: namely, troublesome friction between the inner and outer tire walls, and risk of secondary puncture of the inner tire wall.

To overcome such intrinsic difficulties, different remedies have been proposed for the safety tire of the dual structure type: namely, to add reinforcing members made of soft rubber to reinforce selected portions of the sidewalls of the tire with fibrous reinforcing layers and rubber layers; and to dispose a thick rubber layer on the inner surface of the carcass at the back of the tire tread as in the case of combat tires. However, such remedies are all directed to tires for four-wheeled vehicles, and the tires with such remedies are not suitable for motorcycles. Besides, the remedies do not provide satisfactory high-speed characteristics and stable handling characteristics.

It may be stressed here that, in the case of pneumatic tires for motorcycles, there is a need for high camber thrust. With four-wheeled vehicles, the camber angle for the tire is substantially fixed in a range of small angles, and the camber thrust produced by cambering the tire does not play so important a role as that of the motorcycle tires. More particularly, when a motorcycle driver makes a turn, he inclines the motorcycle relative to a vertical in the direction of the turn by an angle, which angle is generally known as the camber angle. In response to the camber angle, a camber thrust is produced so as to act on the motorcycle through the pneumatic tire. With the motorcycle, the camber thrust plays a very important role in the centripetal force for turning the motorcycle, together with cornering force which is produced by giving a slip angle to the motorcycle tire relative to the longitudinal center line of the motorcycle during the turn. To this end, motorcycle tires generally have a wider tread extending across the crown portion thereof, as compared with that of the tires for four-wheeled vehicles.

Therefore, an object of the present invention is to obviate the aforesaid difficulties of the conventional motorcycle tires, by providing an improved pneumatic safety tire for motorcycles which can be driven at a comparatively high-speed even after puncture or burst, while ensuring a high handling stability and an excellent high-speed performance. The pneumatic safety tire for motorcycles according to the present invention can easily be repaired for reuse, even if it is punctured.

SUMMARY OF THE INVENTION

According to the present invention, there is provided a pneumatic safety tire for motorcycles, which comprises a pair of annular beads, a toroidal carcass extending between the beads, a tire tread secured onto the outer surface of the carcass at the crown portion thereof, a pair of sidewall rubbers secured to the carcass so as to extend from the beads to side edges of the tire tread, and a pair of elastic reinforcing layers extending along the inner surface of the carcass, each of said reinforcing layers being made of rubber with a Shore A hardness of not smaller than 45 and having a thick central portion and thinned edge portions, the reinforcing layer extending toward equatorial plane of the tire in excess of point of alignment between the carcass and radius of curvature of the outer surface of the tire tread at its side edge thereof, the distance X from said point to the terminating point where the equator side edge of the reinforcing layer meets the surface of the carcass being not smaller than 20 percent of the distance L from the aligned point to the equatorial plane along the carcass surface, said elastic reinforcing layer having a maximum thickness corresponding to 3 to 15 percent of maximum section width of the toroidal carcass. The reinforcing rubber layers provide additional hardness to the sidewall rubbers, so that the pneumatic safety tires can run even after puncture or burst thereof.

The pneumatic safety tire for motorcycles according to the present invention may include additional fibrous reinforcing layers which are disposed in the proximity of the annular beads, respectively.

BRIEF DESCRIPTION OF THE DRAWING

For a better understanding of the invention, reference is made to the accompanying drawing, in which:

FIGS. 1A, 1B, 1C, and 1D are schematic sectional views of different embodiments of pneumatic safety tire for motorcycles, according to the present invention;

FIGS. 2A and 2B are schematic sectional views of pneumatic safety tires according to the present invention, each of which tires has additional fibrous reinforcing layers disposed in the proximity of the annular beads thereof;

FIGS. 3A and 3B are schematic sectional views of the pneumatic tire of FIG. 1A and a conventional pneumatic safety tire after puncture, respectively;

FIG. 4 is a graph illustrating the relation between the position of reinforcing rubber layers in the pneumatic safety tire of the invention and camber thrust thereof; and FIGS. 5A and 5B are diagrammatic illustrations of a slip angle $\beta$ and a camber angle $\delta$, respectively.

Like parts are designated by like numerals and symbols throughout the different figures of the drawing.

DESCRIPTION OF THE PREFERRED EMBODIMENTS

FIGS. 1A to 1D illustrate sectional views of different structures of pneumatic safety tire for motorcycles, by taking an example of size 3.50–18 4PR tires for a motorcycle. Referring to FIG. 1A, a pneumatic safety tire 1 according to the present invention comprises a pair of annular bead cores 4c and two carcass plies 6 extending between the bead cores so as to form a carcass layer defining a toroidal peripheral surface thereby. A tire tread rubber 2 is secured to the outer surface of the carcass layer at the crown portion thereof, and sidewall rubbers 3 are secured to the outer side surfaces of the carcass layer so as to extend from the beads 4 to side edges E of the tire tread. In FIG. 1A, the lower ends of the sidewalls 3 define bead portions 4. It should be noted that, in the case of a motorcycle tire, the outer surface of the tire tread 2 is more curved than that of a tire for four-wheeled vehicle: more particularly, equatorial portion C of the tire tread 2 is considerably more spaced from the tire beads 4 than the edges E of the tire tread 2, as measured in a direction perpendicular to the axis of rotation of the tire, while the tire tread for four-wheeled vehicles has more or less flat road-contact surface which is substantially uniformly spaced from axis of rotation thereof. The tire 1 is mounted on a metal rim 7 at the bead portions 4 thereof.

In the embodiment of the pneumatic safety tire 1 of the invention, as shown in FIG. 1A, a pair of elastic reinforcing layers 5 are secured to the inner peripheral surface of the carcass layer, so as to extend from the bead portions 4 toward the equatorial portion D thereof. The elastic reinforcing layer 5 may be made of a comparatively hard elastomeric material, e.g., rubber. For simplicity, the elastic reinforcing layer 5 may be referred to as "reinforcing rubber layer" in the ensuing description, but the material of the elastic reinforcing layer 5 is not restricted to rubber alone. The reinforcing rubber layer has a Shore A hardness of 80. Each of the elastic reinforcing rubber layers 5 has a thick central portion and its thickness is gradually reduced as it extends toward opposite edges thereof.

Each elastic reinforcing layer 5 extends towards the carcass equator D lying on plane C beyond the alignment point F between the carcass layer and edge E of the outer surface of the tire tread having a radius of curvature CE. The length FB by which the elastic reinforcing layer 5 extends beyond the aforesaid alignment point F, which is represented by a symbol X, is about 60 percent of the distance L from the alignment point F to the equator D of the carcass layer. The elastic reinforcing layer 5 has a maximum thickness, which is about 6.5 percent of the maximum width of the inflated carcass layer, as measured parallel to the axis of rotation of the tire.

In FIG. 1A, symbols A and B represent those points of the carcass layer which are spaced from the aforesaid alignment point F by distances X corresponding to 60 and 20 percent of the length L between the alignment point F and the equator D of the carcass layer.

The two elastic reinforcing layers 5 are disposed in symmetry with each other, relative to a plane C through the equator of the tire.

With the present invention, that portion of the elastic reinforcing layer 5 which has the maximum thickness is so disposed as to face the intermediate portion of the sidewall rubber 3 between the edge E of the tire tread 2 and the bead portion 4, and the thickness of the reinforcing layer 5 is gradually reduced as the layer 5 extends toward the edge E and toward the bead portion 4. The reason for selecting such distribution of the thickness of the reinforcing layer 5 is to eliminate sudden changes of the effective hardness of the combination of the sidewall 3 and the reinforcing layer 5. In fact, the effective hardness of the aforesaid combination varies substantially smoothly, without any sudden changes thereof which are detrimental to stable running characteristics of the tire.

The reason for extending the elastic reinforcing layer 5 toward the equator D of the carcass layer in excess of the alignment point F between the carcass layer and the tire tread edge E is to sufficiently strengthen the connection of the sidewall rubber 3 to the tire tread 2 for allowing high-speed running even after tire puncture. Such extension of the elastic reinforcing layer 5 is particularly important in the case of the pneumatic safety tire for motorcycles, because the tire tread 2 of the pneumatic tire of this kind is not flat but is so curved as to extend considerably away from the equator of the tire tread and the thus extended portions of the tire tread 2 should also be reinforced.

When the pneumatic safety tire 1 is thus strengthened by the elastic reinforcing layers 5, the combination of the sidewall rubber 3 and the elastic reinforcing rubber layer 5 can bear the mechanical load on the tire even after it is punctured or burst, as shown in FIG. 3A. It should be noted that the punctured or burst safety tire 1 according to the present invention can produce a large camber thrust and a large cornering force which are sufficient for ensuring safe driving of a motorcycle (not shown) at a considerably high speed, e.g., at 80 Km/hour, over a distance of several hundreds of kilometers.

In order to further improve the lateral rigidity of the pneumatic safety tire 1, the bead portion 4 may be reinforced by a suitable flipper, as shown by dash-dot-lines of FIG. 1A. The flipper may be replaced with a suitable chafer (not shown) or other suitable bead-reinforcing member. The reinforcement of the bead portions 4, however, is not essential to the present invention, but it is optional.

The inventors found that the pneumatic safety tire 1 of the invention has very good performance under normal conditions, such as high-speed durability, camber thrust, and cornering force, which performance is comparable with the corresponding performance of a conventional pneumatic tire for motorcycles without any elastic reinforcing layers, provided that various design factors of the tire 1 are properly selected: namely, hardness, shape, and dimensions of the elastic reinforcing layers 5; fibrous materials, angular disposition, number of sheets, size, and disposition of the flippers or chafers; and the overall shape and structure of the tire 1. As apparent to those skilled in the art, each of the elastic reinforcing layers 5, the flippers and the chafers must be of continuous annular structure, so that the hardness of the tire is radially symmetrical, relative to the axis of rotation thereof.

To allow a motorcycle tire to travel at a high-speed over several hundreds of kilometers after puncture and to ensure excellent performance of the motorcycle tire under sound condition, the following three conditions must be satisfied.

1. To prevent "wrinkles" at sidewall rubbers 3 in the proximity of the edge portions E of the tire tread 2 after puncture. The resilient flexure of a loaded pneumatic tire inevitably increases upon puncture, because its internal pressure is lost by the puncture. Despite the increased flexure, the sidewall rubbers should be prevented from wrinkling.

2. To prevent direct contact of the inner surface of the bead portion 4 with the inner surface of the tire tread 2, which direct contact is shown in FIG. 3B. The direct contact of the inner surfaces of the tire will accelerate frictional fatigue and thermal fatigue of the tire.

3. To prevent the bead portions 4 and the tire tread 2 from buckling. FIG. 3B illustrates such buckling.

Studies of the inventors have proved that, if only the sidewall rubbers 3 of a motorcycle tire are strengthened by elastic reinforcing layers 5, load-bearing ability of the motorcycle tire can be enhanced. The strengthening of the sidewall rubbers 3 alone, however, did not provide satisfactory handling characteristics under sound conditions: namely, a motorcycle tire which was provided with the elastic reinforcing layers at the sidewall rubbers 3 alone had a tendency of swaying laterally during straight driving along a rectilinear path, and handling stability of such motorcycle tire when cambered for turning proved to be poor.

The inventors have found that the aforesaid difficulties which are inherent to the strengthening of the sidewall rubbers alone, i.e., the lateral swaying and the poor handling stability, can be mitigated by extending the elastic reinforcing layers 5 toward the equator D of the tire carcass along the inner surface of the carcass underneath the tire tread 2. Let it be assumed that distance X represents the length of that part of the elastic reinforcing layer 5 which is extended toward the tire equator D in excess of intersection between the carcass and the radius of curvature CE of the outer surface of the tire tread side edge E. When the aforesaid distance X is selected to be not smaller than 20 percent of the distance L from the intersection to the equator D, the handling stability of the motorcycle tire was found to be noticeably improved, and the camber thrust of the motorcycle tire was considerably improved.

The inventors' tests indicated that the hardness of the rubber material for the elastic reinforcing layers 5 should be 45 or more in Shore A hardness, preferably 60 to 90. According to the result of the tests, the maximum thickness of the elastic reinforcing layer 5, taken parallel to the axis of rotation of the tire, should be 3 to 15 percent of the maximum width of the carcass, preferably about 9 percent thereof. When the thickness of the elastic reinforcing layer 5 is less than 3 percent of the maximum carcass width, the desired reinforcing effect cannot be achieved, while the thickness of the elastic reinforcing layer which is thicker than 15 percent of the maximum carcass width tends to cause excessive heat generation at the reinforcing layer which may lead to separation thereof from adjacent layers of the tire.

When the reinforcement was stressed at the tire tread and the sidewall rubbers, smooth variation of the camber thrust could not be achieved in response to the change of the camber angle. On the other hand, when the reinforcement was stressed at the sidewall rubbers and the bead portions, the tire tread flexes excessively during driving, so that handling stability proved to be too poor. Thus, it was found that the overall thickness of the tire wall, inclusive of the carcass, the tire tread and the sidewall rubbers, should vary smoothly as it extends across the two bead portions, so that no sudden change of the stiffness of the tire will be caused throughout the entire span thereof. The stiffness at the boundary portion between the edges of the tire tread 2 and the sidewall rubbers 3 is very important, because it plays a critical role in generating the camber thrust when the tire 1 is cambered. Accordingly, the overall wall thickness at this boundary portion should not vary too quickly. With the present invention, the configuration of the elastic reinforcing layer 5 is so chosen that, as the outer surface of the tire 1 extends from the edge E of the tire tread 2 to the sidewall rubber 3, the inner surface of the tire 1 extends substantially in parallel to the outer surface thereof, so as to provide a substantially constant overall wall thickness at the boundary portion.

When the tire 1 is run with a finite slip angle $\beta$ as shown in FIG. 5A, or when the tire 1 is punctured and operated under the conditions as shown in FIG. 3A, a twisting force is produced in that one of the bead portions 4 which is located closer to the road surface than the other one is. To supplement the strength of the bead portions of the tire against such twisting force, it is preferable to provide chafers and/or flippers at the bead portions. It should be noted that such chafers and flippers are also effective in improving the cornering force characteristics of the tire.

FIG. 1B illustrates a modification of the pneumatic safety tire for motorcycles of FIG. 1A. In this embodiment, a pair of reinforcing rubber layers 5 are used, which rubber layers are disposed between two carcass plies 6 of the tire 1. The construction of the tire of FIG. 1B is identical to that of FIG. 1A, except the location of the reinforcing layers 5.

FIG. 1C illustrates a different modification of the tire of FIG. 1A. The tire construction, as illustrated in FIG. 1C is a kind of combination of the structures of FIGS. 1A and 1B, because the embodiment of FIG. 1C uses two reinfocing rubber layers, each having two elements 5a and 5b, the element 5a being disposed on the inner surface of the tire wall while the element 5b being disposed between two carcass layers 6. The two elements 5a and 5b are of comparable size, and they are partially overlapped with each other while having one carcass layer 6 disposed therebetween. The overall thickness of the reinforcing layer 5, which is a sum of the thicknesses of the two elements 5a and 5b, is about 6.5 percent of the maximum width of the inflated carcass layer, taken in parallel to the axis of rotation of the tire. Except the use of the two elements 5a and 5b in the reinforcing rubber layers 5, the construction of FIG. 1C is the same as that of FIG. 1A.

FIG. 1D illustrates a modification of the embodiment of FIG. 1C. In the embodiment of FIG. 1D, two elements 5a and 5b are used in each of a pair of reinforcing rubber layers 5, and the element 5b disposed between two carcass plies 6 is smaller than the other element 5a disposed on the inner surface of the tire wall. Each smaller element 5b has one end thereof kept in contact with a bead core 4c. The opposite end of each smaller element 5b is partially overlapped with the larger element 5a with one of the carcass layers 6 disposed therebetween.

FIGS. 2A and 2B illustrate other examples of pneumatic safety tire according to the present invention. These examples are for motorcycle wheels of 3.50-18 4PR type. The construction of FIGS. 2A and 2B is different from that of the preceding embodiments in that an additional reinforcing means is disposed in each of the two bead portions 4. In the example of FIG. 2A, a chafer 8 is embedded in each of the tire sidewalls so as to extend from bead core 4c substantially in parallel with the carcass layers 6. To form the chafer 8, a rubberized steel layer partially overlaps a reinforcing rubber layer 5 with the carcass plies 6 disposed therebetween. In the embodiment, as shown in FIG. 2A, the chafer 8 consisting of the rubberized cord layer extends along the outside of the carcass plies 6 to a height of about 40 mm from the lower edge of the bead core 4c. The chafer 8 is made by disposing cords in parallel at a rate of 30.5 cords per 5 cm, and rubberizing the cord layer thus formed. The cords in the chafer 8 which is embedded in the tire have an angle of 45° relative to the equatorial direction of the tire. Each cord of the chafer 8 comprises two filaments of 0.23 mm diamter each, seven filaments of the same diameter which are concentrically twisted around the two filaments, and one filament of 0.15 mm diameter which is wound around the outer periphery of the seven fialments.

FIG. 2B shows another embodiment of the invention which includes two flippers 9 surrounding each of the two bead cores 4c. The two flippers 9 extend along two carcass plies through a space therebetween. The maximum distance by which the flippers extend is 40 mm from the lower edge of the bead core 4c, as seen in FIG. 2B. In order to prevent sudden change of the rigidity of bead portion and sidewall of the tire, about 5 mm intervals are provided between adjacent terminals of the flippers 9, as can be seen from FIG. 2B.

Each flippers 9 comprises a rubberized rayon cord layer with a cord density of 35 cords per 5 cm, and each cord consists of three 1,650 denier rayon filaments. The cords of the chafer 9 are disposed at 90° relative to the equatorial direction of the tire.

The inventors have tested the relation among the hardness of the reinforcing rubber layer 5, the extent X by which the reinforcing rubber layer 5 extends toward the tire equator in excess of the intersection between the carcass inner surface and the radius of curvature at the edge E of the tire tread 2, and camber thrust Q produced by the pneumatic safety tire. The result is shown in FIG. 4. The test were carried out for punctured conditions, i.e., without applying pneumatic pressure to the inside of the tire. A metallic rim of 1.85B×18 type was used in the tests for mounting the test tires, and a load of 150 Kg was applied to the test tires. In the graph of FIG. 4, the abscissa represents X/L ratio, X being the aforesaid extent and L being the distance from the equator of the carcass inner surface to the intersection between the carcass inner surface and the radius of curvature at the edge E of the tire tread 2. The ordinate in FIG. 4 represents camber thrust Q, in Kg, at a camber angle $\delta$ of 40°. FIG. 5B schematically illustrates the camber angle $\delta$ and the direction of the camber thrust Q. Tests were made for reinforcing rubber layers 5 with different values of Shore A hardness: namely, Shore A hardnesses of 90, 80, 60, 45, and 30. All the tires tested had the reinforcing rubber layers 5, which were disposed in the manner as shown in FIG. 1A, and the maximum thickness of the reinforcing layer was the same for all the test tires, i.e., 9 percent of the maximum tire carcass width. Each of the test tires was a regular bias tire of 3.50-18 4PR type for motorcycle rear wheel and each tire included two carcass plies having rayon cords, each cord consisting of two 1,260 denier rayon filaments.

Referring to the curves of FIG. 4, especially the curve for the reinforcing rubber layer with a Shore A hardness of 80, the reinforcement of the tire sidewalls alone, i.e., the X/L ratio of zero, does not provide any significant improvement of the camber thrust, as compared with that of a tire without any reinforcing rubber layers. As the reinforcing rubber layers 5 extend underneath the tire tread 2, however, the camber thrust is markedly improved. With the X/L ratio of 20 percent, the camber thrust is more than doubled, as compared with that of non-reinforced tire.

As regards the hardness of the reinforcing rubber layer 5, if the Shore A hardness thereof is 30, any significant improvement of the camber thrust cannot be achieved even when the reinforcing layer is extended toward the tire equator to an X/L ratio of 60 percent, as can be seen from FIG. 4. To achieve the desired improvement, a Shore A hardness of not smaller than 45 is necessary.

Further tests were made on the reinforcing effects of the chafer at the bead portion of the tire. The result is shown in the following table, in which camber thrust and cornering force of test tires are shown in percent of those of Reference tire.

| Tire tested | Camber thrust Q (at camber angle $\delta$ of 40°) | Cornering force F (at slip angle $\beta$ of 6°) |
| --- | --- | --- |
| Reference | 100 | 100 |
| Test tire I | 177 | 150 |
| Test tire J | 392 | 285 |
| Test tire K | 400 | 540 |

Reference tire: Tire without any reinforcing rubber layer 5, which corresponds to the tire shown in FIG. 4 by solid dot.
Test tire I: Tire corresponding to the tire as shown in FIG. 4 by the curve of -Continued

| Tire tested | Camber thrust Q (at camber angle δ of 40°) | Cornering force F (at slip angle β of 6°) |
| --- | --- | --- |
| | Shore A hardness 80 with X/L ratio 0%. | |
| Test tire J: | Tire corresponding to the tire as shown in FIG. 4 by the curve of Shore A hardness 80 with X/L ratio 60%. | |
| Test tire K: | Tire similar to test tire J and has one steel wire chafer for each bead as shown in FIG. 2A. | |
| Test conditions: | Tire internal pressure removed; Mounted on a metallic rim of 1.85B; and Loaded at 150 Kg. | |

As apparent from the table, if the tire tread is sufficiently strengthened by the reinforcing rubber layers, the addition of the chafers do not result in any significant improvement of the camber thrust. The cornering force, however, can be improved by the addition of the chafers even after the strengthening of the tire tread by the reinforcing layers 5. Although it is not shown in the table, the inventors have found through the tests that the addition of the chafers alone do not cause any material improvement in either the camber thrust or the cornering force. Thus, the combination of the reinforcing rubber layers 5 and the chafers 8 produces remarkable effects, as can be seen from the table.

The inventors have carried out the following tests on the test tires J and K of the table.

1. Endurance for running after puncture.

After removing the internal pressure, the test tires were run at 60 Km/hour under a load of 150 Kg for 8 hours over a distance of 480 Km. No difficulties were experienced in the run.

2. High-speed endurance.

After the aforesaid test of endurance for running after puncture, the test tires were inflated at rated internal pressure, and drum tests were carried out on the test tires in accordance with the stipulations of FMVSS (Federal Motor Vehicles Safety Standard) No. 119. The test results were the same as those for regular tires which were not subjected to the endurance running.

3. Handling stability after puncture.

a. Handling stability during straight running at 120 Km/hour was found to be the same as that of a regular inflated tire. No swaying was experienced at the time of deceleration. When brake was applied while running at about 60 Km/hour, the tires came to complete stop in about 15 m.

b. While cruising straightly at 60 Km/hour, driving lane was changed over a lateral distance of 3.6 m. The lane change was completed in about 15 m of driving, and no swaying was experienced immediately after the lane change.

To make the pneumatic safety tire according to the present invention, the reinforcing rubber layers 5 may be extruded in the same manner as extruding tread rubbers. The extruded reinforcing rubber layers may be applied to a drumlike former, so as to produce a tire case in the same manner as conventional tires. The pneumatic safety tire according to the present invention can be formed and vulcanized by a conventional tire-making process without applying any significant modification.

We claim:

1. A pneumatic safety tire for motorcycles, comprising: a pair of axially spaced annular beads, a toroidal carcass extending across the beads and forming a pair of sidewalls connected by a carcass crown portion, a tire tread secured onto the outer surface of the carcass at said crown portion, said tire tread having a width sufficiently wide to provide a thorough contact area with the ground even when the tire is tilted at a camber angle when cornering and having a substantially uniform thickness along the outer peripheral surface of said carcass, a pair of sidewall rubbers secured to the carcass and extending from the beads to the side edges of the tire tread, and a pair of elastic reinforcing layers continuously extending along the inner surface of the carcass in a complementary fashion to said sidewalls to supplement the thickness of said sidewalls and enhance the rigidity of the sidewalls and their ability for supporting a load under conditions of reduced tire pressure, each of said reinforcing layers being made of a rubber-like material with a Shore A hardness of no less than 45 and having a relatively thick central portion and thinned edge portions which become progressively thinner toward the ends thereof, said reinforcing layer extending toward the equatorial plane of the tire beyond the point of alignment with the side edge of the tire tread with the distance X from the alignment point to the termination point of the reinforcing layer with said carcass in the direction of the equatorial plane of the tire being not smaller than 20 percent of the distance L from the alignment point to the equatorial plane of the carcass, said elastic reinforcing layer having a maximum thickness corresponding to 3 to 15 percent of the maximum width of the toroidal carcass under inflated condition.

2. A pneumatic safety tire according to claim 1 and further comprising a pair of reinforcing layers which are disposed adjacent the annular beads, whereby those portions of the tire which are located between the annular beads and the sidewall rubbers are reinforced.

3. A pneumatic safety tire according to claim 1, wherein said elastic reinforcing layers are rubber layers.

4. A pneumatic safety tire according to claim 1, wherein each of said elastic reinforcing layers has its thickest portion at a position between the annular bead and the tire tread, and the thickness of the reinforcing layer gradually diminishes as the reinforcing layer extends toward the tire equator and toward the tire bead.

5. A pneumatic safety tire according to claim 2, wherein each of said elastic reinforcing layers has it thickest portion at a position between the annular bead and the tire tread, and the thickness of the reinforcing layer gradually diminishes as the reinforcing layer extends toward the tire equator and the tire bead.

6. A pneumatic safety tire according to claim 4, wherein the elastic reinforcing layers are disposed on the inner surface of innermost one of the carcass plies.

7. A pneumatic safety tire according to claim 4, wherein each of the elastic reinforcing layers includes a first section disposed on the inner surface of the innermost one of the carcass plies and a second section disposed between adjacent carcass plies, said first and second sections of the elastic reinforcing layer are partially overlapped with each other with one of the carcass plies disposed therebetween.

8. A pneumatic safety tire according to claim 7, wherein said second section of the elastic reinforcing layer is in contact with the annular bead at one end thereof.

9. A pneumatic safety tire according to claim 4, wherein the distance X is 60 percent of the distance L, and said elastic reinforcing layer has a maximum thickness corresponding to 6.5 percent of the width of the toroidal carcass.

10. A pneumatic safety tire according to claim 5 and further comprising a pair of chafers including steel wires disposed in the proximity of the annular bead, the sidewall side end of the chafer overlapping the bead side end of the elastic reinforcing layer with the carcass plies disposed therebetween.

11. A pneumatic safety tire according to claim 5 and further comprising rayon cord flippers which are disposed at the bead portions thereof, the flippers having one end thereof being partially overlapped with the elastic reinforcing layer with the carcass plies disposed therebetween.

* * * * *